US011570648B2

United States Patent
Ratnam et al.

(10) Patent No.: US 11,570,648 B2
(45) Date of Patent: Jan. 31, 2023

(54) METHOD AND APPARATUS FOR BASE STATION AUDIT CORRECTION IN WIRELESS COMMUNICATION NETWORKS

(71) Applicant: Samsung Electronics Co., Ltd., Suwon-si (KR)

(72) Inventors: Vishnu Vardhan Ratnam, Plano, TX (US); Samuel Albert, Robbinsville, NJ (US); Rubayet Shafin, Allen, TX (US); Hao Chen, Allen, TX (US); Yan Xin, Princeton, NJ (US); Mandar N. Kulkarni, Richardson, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 17/152,669

(22) Filed: Jan. 19, 2021

(65) Prior Publication Data

US 2021/0360456 A1   Nov. 18, 2021

Related U.S. Application Data

(60) Provisional application No. 63/025,751, filed on May 15, 2020.

(51) Int. Cl.
*H04W 24/10* (2009.01)
*H04B 17/10* (2015.01)
(Continued)

(52) U.S. Cl.
CPC .......... *H04W 24/10* (2013.01); *H04B 17/101* (2015.01); *H04B 17/318* (2015.01);
(Continued)

(58) Field of Classification Search
CPC ..... H04W 24/10; H04W 16/18; H04W 48/16; H04W 64/003; H04W 24/02;
(Continued)

(56) References Cited

U.S. PATENT DOCUMENTS 9,140,775 B2 * 9/2015 Mueck .................. H04L 5/0007
9,698,897 B2 * 7/2017 Harrang ............... H04B 7/2606
(Continued)

OTHER PUBLICATIONS

Ling, C., "Attitude Estimation for In-Service Base Station Antenna Using Downlink Channel Fading Statistics", International Journal of Antennas and Propagation, vol. 2015, Article ID 898631, Apr. 2015, 15 pages.

(Continued)

*Primary Examiner* — Benjamin H Elliott, IV

(57) ABSTRACT

A method for operating a base station is provided. The method includes in response to a triggering event, fetching information on a base station (BS) configuration parameters comprising a location, a height, an antenna pattern, and topographical details surrounding the BS; determining the BS configuration parameters that are error prone and require re-estimation; obtain measurement reports created by at least one user equipment (UE); determining an audit method to perform an audit correction, the audit correction based on the one or more of the BS configuration parameters to re-estimate, available BS information and the measurement reports; performing the audit correction, to obtain a result based on a computed score for each candidate value of the BS configuration parameters; generating, based on the result, one or more corrective actions; and adjusting at least one of the BS configuration parameters based on the one or more corrective actions.

20 Claims, 13 Drawing Sheets

(51) Int. Cl.
    *H04W 64/00*     (2009.01)
    *H04W 16/18*     (2009.01)
    *H04W 48/16*     (2009.01)
    *H04B 17/318*     (2015.01)

(52) U.S. Cl.
    CPC ........... *H04W 16/18* (2013.01); *H04W 48/16* (2013.01); *H04W 64/003* (2013.01)

(58) Field of Classification Search
    CPC .... H04B 17/101; H04B 17/318; H04B 17/21; H04B 17/373; H04B 17/3913
    See application file for complete search history.

(56) References Cited

U.S. PATENT DOCUMENTS

| | | | | |
|---|---|---|---|---|
| 2011/0188384 | A1* | 8/2011 | Ortega | H04L 12/28 370/254 |
| 2012/0307697 | A1* | 12/2012 | Mukhopadhyay | H04W 24/02 370/328 |
| 2014/0120947 | A1* | 5/2014 | Siomina | G01S 5/0221 455/456.1 |
| 2014/0342721 | A1* | 11/2014 | Pollakowski | H04W 4/50 455/418 |
| 2018/0262313 | A1* | 9/2018 | Nam | H04L 5/0044 |
| 2019/0014487 | A1* | 1/2019 | Yang | G06N 3/04 |
| 2019/0182730 | A1* | 6/2019 | Yeh | H04L 43/062 |
| 2019/0215700 | A1* | 7/2019 | Sofuoglu | H04W 16/26 |
| 2019/0229953 | A1* | 7/2019 | Hu | H04B 7/0413 |
| 2021/0143883 | A1* | 5/2021 | Yerramalli | H04W 24/10 |
| 2021/0360456 | A1* | 11/2021 | Ratnam | H04B 17/318 |

OTHER PUBLICATIONS

Shah, B., "Estimation of azimuth of a macro cell through user data for LIE access network", Sādhanā, vol. 44, Article No. 164, Jun. 2019, 9 pages.

International Search Report and Written Opinion of the International Searching Authority in connection with International Application No. PCT/KR2021/003446 dated Jun. 25, 2021, 6 pages.

* cited by examiner

METHOD AND APPARATUS FOR BASE STATION AUDIT CORRECTION IN WIRELESS COMMUNICATION NETWORKS

CROSS-REFERENCE TO RELATED APPLICATIONS AND CLAIM OF PRIORITY

The present application claims priority to U.S. Provisional Patent Application No. 63/025,751 filed on May 15, 2020. The content of the above-identified patent document is incorporated herein by reference.

TECHNICAL FIELD

The present disclosure relates to electronic devices and methods for predicting and updating base station configuration parameters in wireless communication networks.

BACKGROUND

Configuration parameters of a Base Station (BS), including location, height, azimuth and tilt angles, and pattern of antenna array, significantly impact the coverage of the BS. Consequently, these parameters are set judiciously so that the overall coverage and throughput of the cellular network are maximized. Although the BS location, antenna pattern, and height are fixed in most cases, azimuth and tilt angles may often need to be manually reconfigured based on a network condition. Such reconfiguration tasks are susceptible to human errors and use of uncalibrated devices, leading to a mismatch between the actual configuration and the prescribed configuration stored in the centralized database. These errors may get further exacerbated by misalignment due to natural phenomena, such as heavy wind, earthquakes, and the like. Such errors can adversely impact network automation optimization applications, resulting in detrimental effects such as coverage holes, cell overshooting etc. Hence, operators need to invest significant effort to routinely re-estimate the BS parameters, especially the azimuth and tilt angles, to minimize these errors.

SUMMARY

Embodiments of the present disclosure provide methods and apparatuses for automatic and accurate estimation of the error-prone BS configuration parameters with minimal human-intervention in an advanced wireless communication system.

In one embodiment, an apparatus is provided. The apparatus includes a transceiver configured to communicate via a wired or wireless communication medium; and a processor. The processor is configured to: in response to a triggering event, fetch information on a base station (BS) configuration parameters, the BS configuration parameters comprising at least one of: a location of the BS, a height of the BS, an antenna pattern of the BS, and topographical details surrounding the BS; determine one or more of the BS configuration parameters that are error prone and require re-estimation; obtain measurement reports created by at least one user equipment (UE), wherein the measurement reports comprise a signal strength value and a location of the at least one UE; determine an audit method to perform an audit correction; perform the audit correction, to obtain a result based on a computed score for each candidate value of the one or more of the BS configuration parameters; generate, based on the result, one or more corrective actions; and adjust at least one of the BS configuration parameters based on the one or more corrective actions.

In another embodiment, a method is provided. The method includes in response to a triggering event, information on a base station (BS) configuration parameters, the BS configuration parameters comprising at least one of: a location of the BS, a height of the BS, an antenna pattern of the BS, and topographical details surrounding the BS. The method also includes determining one or more of the BS configuration parameters that are error prone and require re-estimation. The method also includes obtaining measurement reports created by at least one user equipment (UE), wherein the measurement reports comprise a signal strength value and a location of the at least one UE. The method also includes determining an audit method to perform an audit correction. The method also includes performing the audit correction to obtain a result based on a computed score for each candidate value of the one or more of the BS configuration parameters. The method further includes generating, based on the result, one or more corrective actions; and adjusting at least one of the BS configuration parameters based on the one or more corrective actions.

In yet another embodiment, a non-transitory computer readable medium is provided. The non-transitory computer readable medium a plurality of instructions that, when executed by a processor, is configured to cause the processor to: in response to a triggering event, fetch information on a base station (B S) configuration parameters, the BS configuration parameters comprising at least one of: a location of the BS, a height of the BS, an antenna pattern of the BS, and topographical details surrounding the BS; determine one or more of the BS configuration parameters that are error prone and require re-estimation; obtain measurement reports created by at least one user equipment (UE), wherein the measurement reports comprise a signal strength value and a location of the at least one UE; determine an audit method to perform an audit correction; perform the audit correction to obtain a result based on a computed score for each candidate value of the one or more of the BS configuration parameters; generate, based on the result, one or more corrective actions; and adjust at least one of the BS configuration parameters based on the one or more corrective actions.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
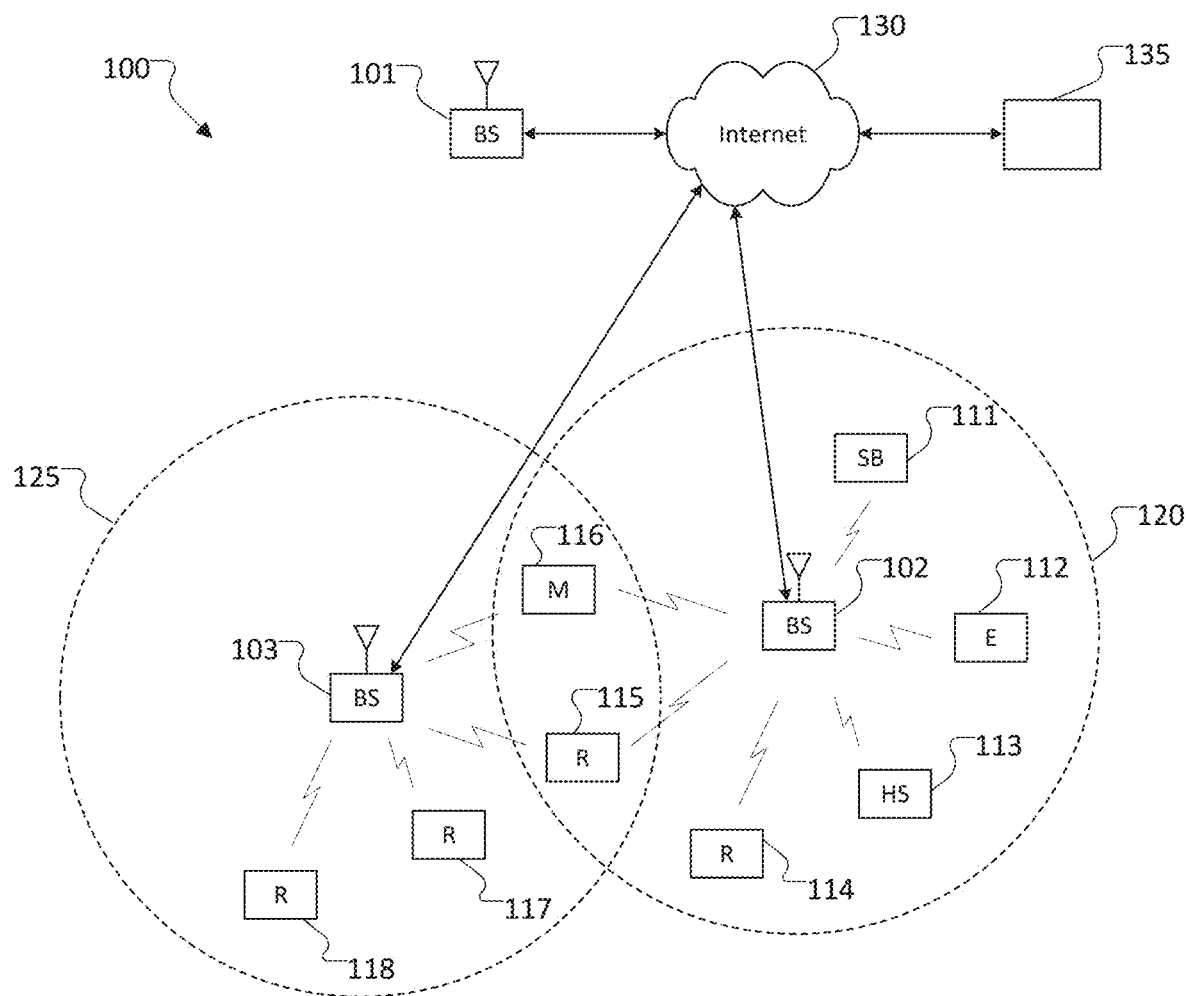
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Current mechanisms for updating or correcting the base station (BS) parameters involve identifying poorly performing cells using tertiary metrics, and deploying a site engineer to go diagnose the reason for poor performance. Since the causes for poor performance can by many, this approach can lead to a large number of false positives. Additionally, deploying a site engineer to diagnose errors is a time consuming and expensive endeavor and is not a scalable solution for a nation-wide network with hundreds of thousands of BSs.

To address this issue, embodiments of the present disclosure provides mechanisms for automatic and accurate estimation of the error-prone BS configuration parameters with minimal human-intervention. Embodiments of the present disclosure provide methods to predict the configuration parameters of base-stations without manual intervention or inspection. In this approach, some users (subscribers and/or agents deployed by service provider) in the cell periodically report their measured reference signal receive power (RSRP) values and locations to the BS. A core network entity uses these reports to predict the base-station parameters. Certain embodiments provide new methodologies for estimating and correcting multiple BS parameters, including both azimuth and M-tilt angles. Certain embodiments provide estimation methodologies that can work both with or without the availability of an RSRP prediction tool like ray-tracing, account for any modeling errors and inaccuracies in user reports.

Knowledge of currently configured base-station parameters is of vital importance for network automation optimization. Embodiments of the present disclosure significantly reduce the cost and time required for accurately estimating these base-station parameters. Accurate knowledge of these parameters can further boost the overall network performance significantly.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system, as well as non-terrestrial networks (NTN). Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying (FSK) and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
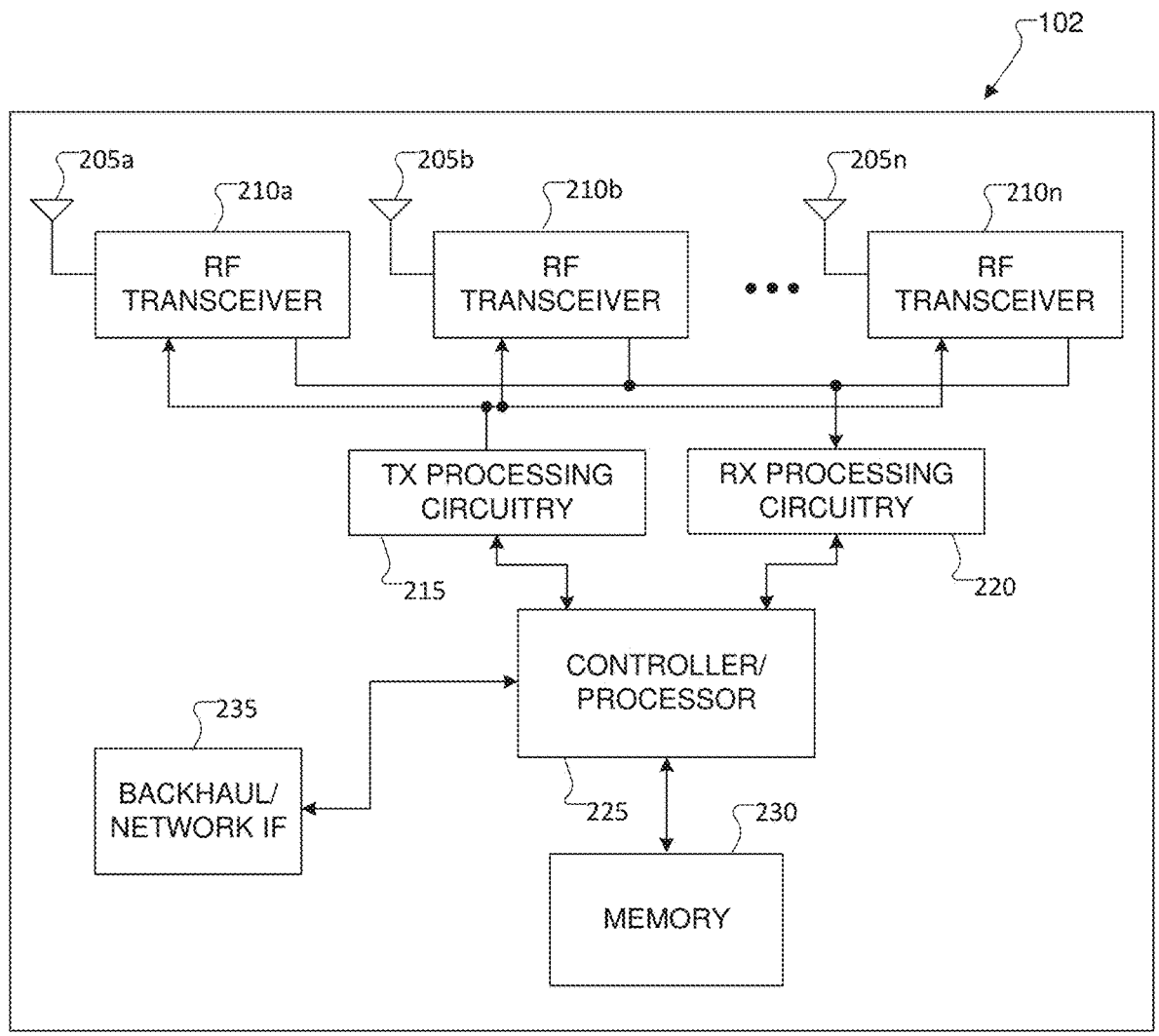
FIG. 2 illustrates an example gNB according to embodiments of the present disclosure.
Figure 3:
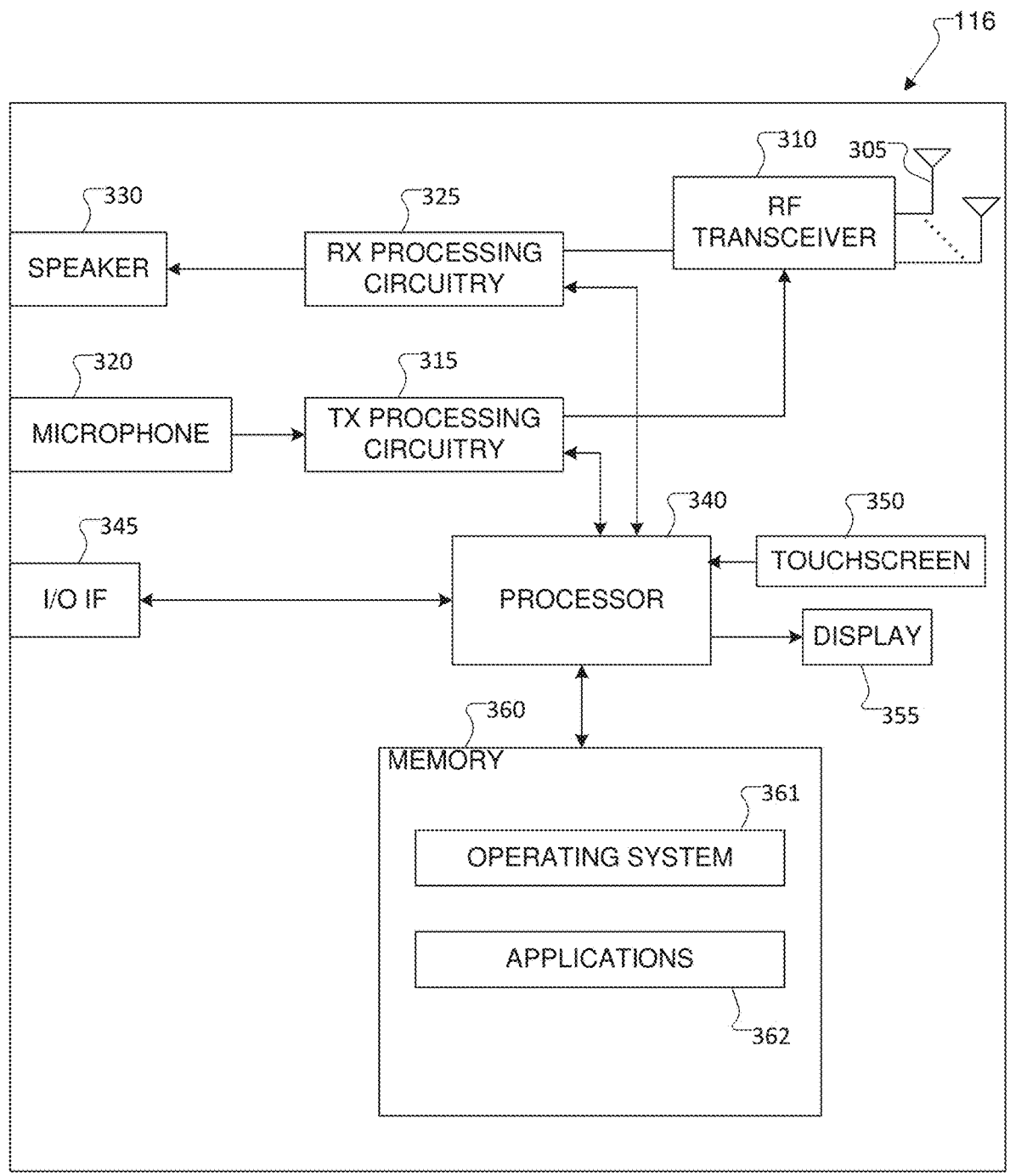
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

Certain embodiments of the disclosure may be derived by utilizing a combination of several of the embodiments listed below. Also, it should be noted that further embodiments may be derived by utilizing a particular subset of operational steps as disclosed in each of these embodiments. This DOI should be understood to cover all such embodiments.

Certain embodiments of the present disclosure are described assuming cellular DL communications. However, the same/similar principles and related signaling methods & configurations can also be used for cellular UL & sidelink (SL).

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one core network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116 as well as a UE 117, which may be located in a third residence (R), and a UE 118, which may be located in another residence (R). In some embodiments, one or more of the gNBs 101-103 may communicate with each other and with the UEs 111-118 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the gNBs 101-103 include circuitry, programing, or a combination thereof, for performing the audit correction to obtain a result based on a computed score for each candidate value of the one or more of the BS configuration parameters; generating, based on the result, one or more corrective actions; and adjusting at least one of the BS configuration parameters based on the one or more corrective actions.

In certain embodiments, gNB 102 may be connected to the core network 130 by a fiber/wired backhaul link. As indicated herein above, gNB 102 serves multiple UEs 111-116 via wireless interfaces respectively. Using this wireless interface, a UE 116 receives and transmit signals to gNB 102. Using signals received from a non-serving gNB 103, a UE 116 may also receive signals from a neighboring gNB 103. The core network 130 may further include a core network entity (CNE) 135, which responsible for the task of site audit correction, as described herein below. In certain embodiments, the CNE 135 is a base station, such as gNB 103.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing. The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n. In certain embodiments, the RF transceivers 210a-210n perform transmission and reception via radio waves or wired communications. For example, communications may be accomplished via wired connections, optical fiber systems, communication satellites, radio waves, and the like.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform a blind interference sensing (BIS) process, such as performed by a BIS algorithm, and decode the received signal subtracted by the interfering signals. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory 230. The plurality of instructions is configured to cause the controller/processor 225 to perform the BIS process and to decode a received signal after subtracting out at least one interfering signal determined by the BIS algorithm.

As described in more detail below, the transmit and receive paths of the gNB 102 (implemented using the RF transceivers 210a-210n, TX processing circuitry 215, and/or RX processing circuitry 220) support configuring one or more repetitions for one or more of a physical downlink control channel (PDCCH), a physical downlink shared channel (PDSCH), or a physical uplink shared channel (PUSCH), wherein a configuration information comprises a parameter to extend a maximum number of repetitions for the channel and transmitting the one or more repetitions according to the configuration information.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
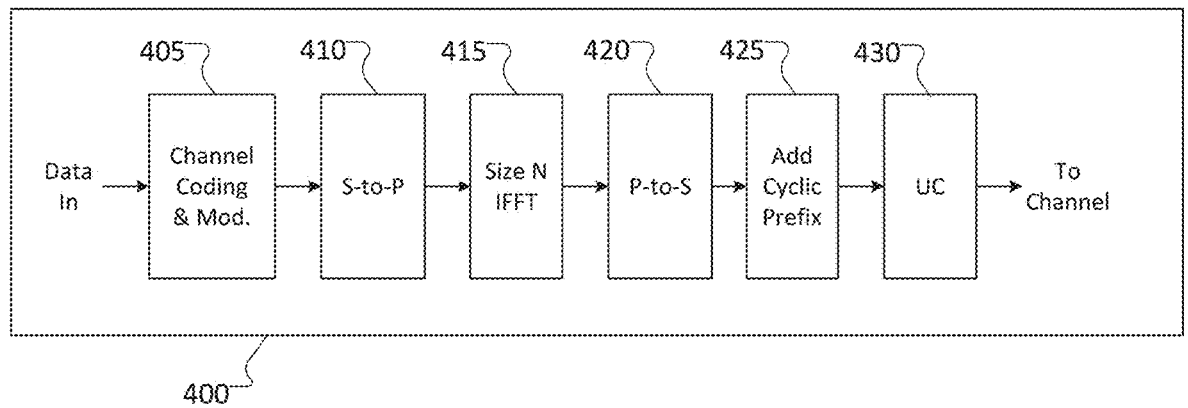
FIG. 4A illustrates a high-level diagram of an orthogonal frequency division multiple access transmit path according to embodiments of the present disclosure.
Figure 4B:
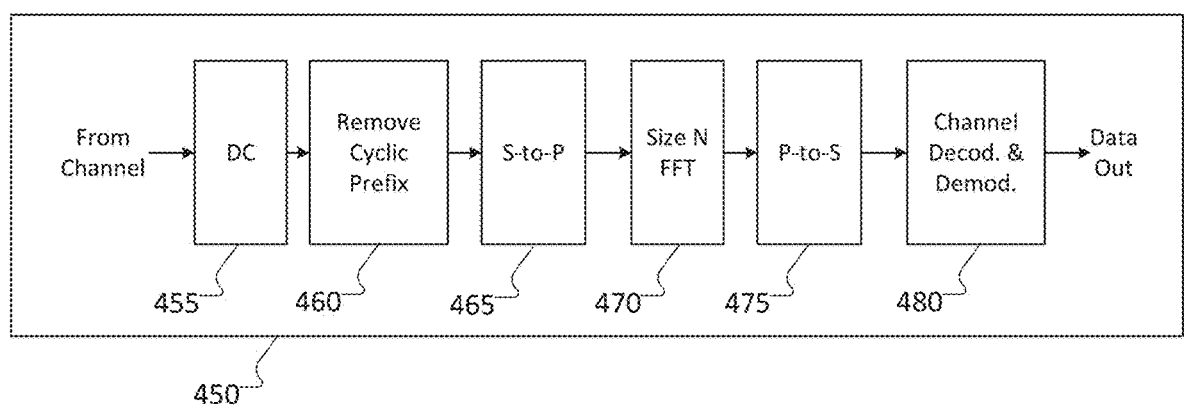
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement (ACK) information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a transmission BW. For a PUCCH, $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

FIGS. 5A-D illustrate base station configuration parameters and corresponding effect on a received power heat map according to embodiments of the present disclosure. The embodiments of the base station configuration parameters and corresponding effect on a received power heat map shown in FIGS. 5A-D are for illustration only and other embodiments can be used without departing from the scope of the present disclosure.

Figure 5A:
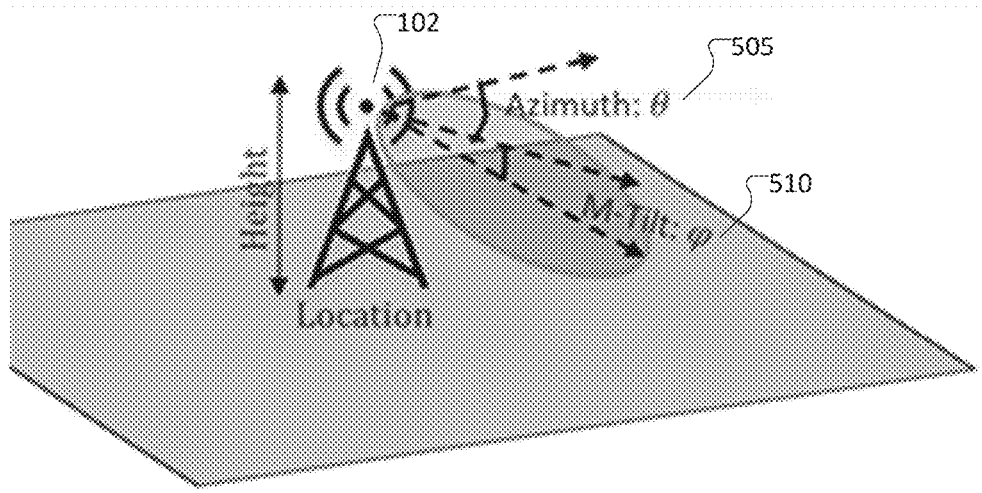
FIGS. 5A-D illustrate base station configuration parameters and corresponding effect on a received power heat map according to embodiments of the present disclosure.
Figure 5B:
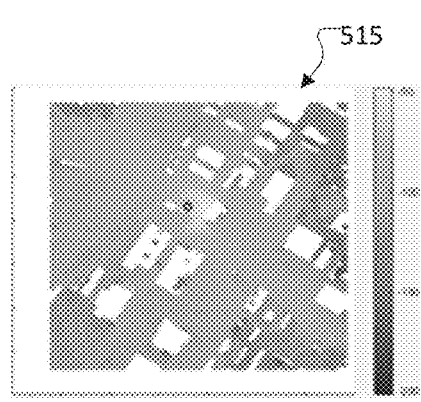
Figure 5C:
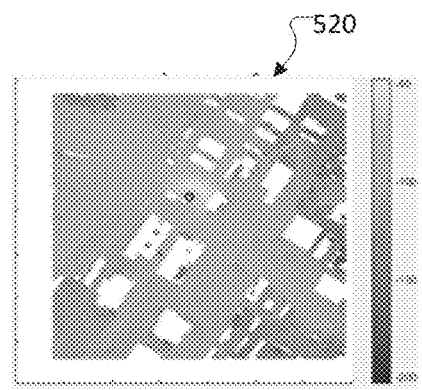
Figure 5D:
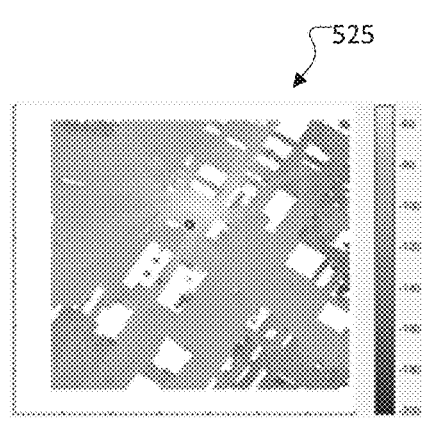

The configuration of a gNB 102 can involve many different parameters, such as their location, antenna height, antenna pattern, mechanical tilt (M-tilt), electrical tilt (E-tilt), azimuth angle, and the like. As illustrated in FIG. 5A-D, these parameters may impact the coverage pattern of a BS significantly. For example, FIG. 5B illustrates a received power heat map 515 when an azimuth θ=0°; FIG. 5C illustrates a received power heat map 520 when an azimuth θ=55° and M-tilt φ=9°; and FIG. 5D illustrates a received power heat map 525 when an azimuth θ=55° and M-tilt φ=3°.

Consequently, referring again to FIG. 1, the parameters of gNB 102 may substantially impact the service quality to UEs 111-116. An incorrectly chosen set of these parameters can degrade network coverage and cause a plethora of issues, such as coverage islands, coverage holes, cell overshoot problems, and so forth. Therefore, significant effort is spent in network planning and optimization to determine an optimal choice of these parameters prior to installing BSs. Some of these parameters may also be reconfigurable, such as the azimuth angle θ 505, E-tilt, M-tilt φ 510, and the like, and may be changed by the network service provider to adapt to a changing radio-frequency (RF) environment. The reconfiguration of azimuth angle θ 505 and M-tilt φ 510, in particular, may require intervention by a site engineer and may be prone to human error. Examples of such errors may include misalignment with the desired angle, swapping of antenna ports, use of uncalibrated measurement equipment, and so forth. Environmental conditions like wind, earthquakes, birds, and the like, can also impact the physical orientation of the antenna affecting these parameters over time. Finally, since these BS parameters are stored in a database, the BS parameters may also be prone to bookkeeping errors. While misaligned BS parameters may degrade performance, book-keeping errors may lead to incorrect estimates of network performance and can adversely affect many self-organization network (SON) applications. Thus, due to the critical impact of BS parameters on network performance, a mechanism may be required to estimate the currently configured set of BS parameters. This task of predicting and correcting the BS configuration parameters is often referred to as the site audit correction problem.

Figure 6:
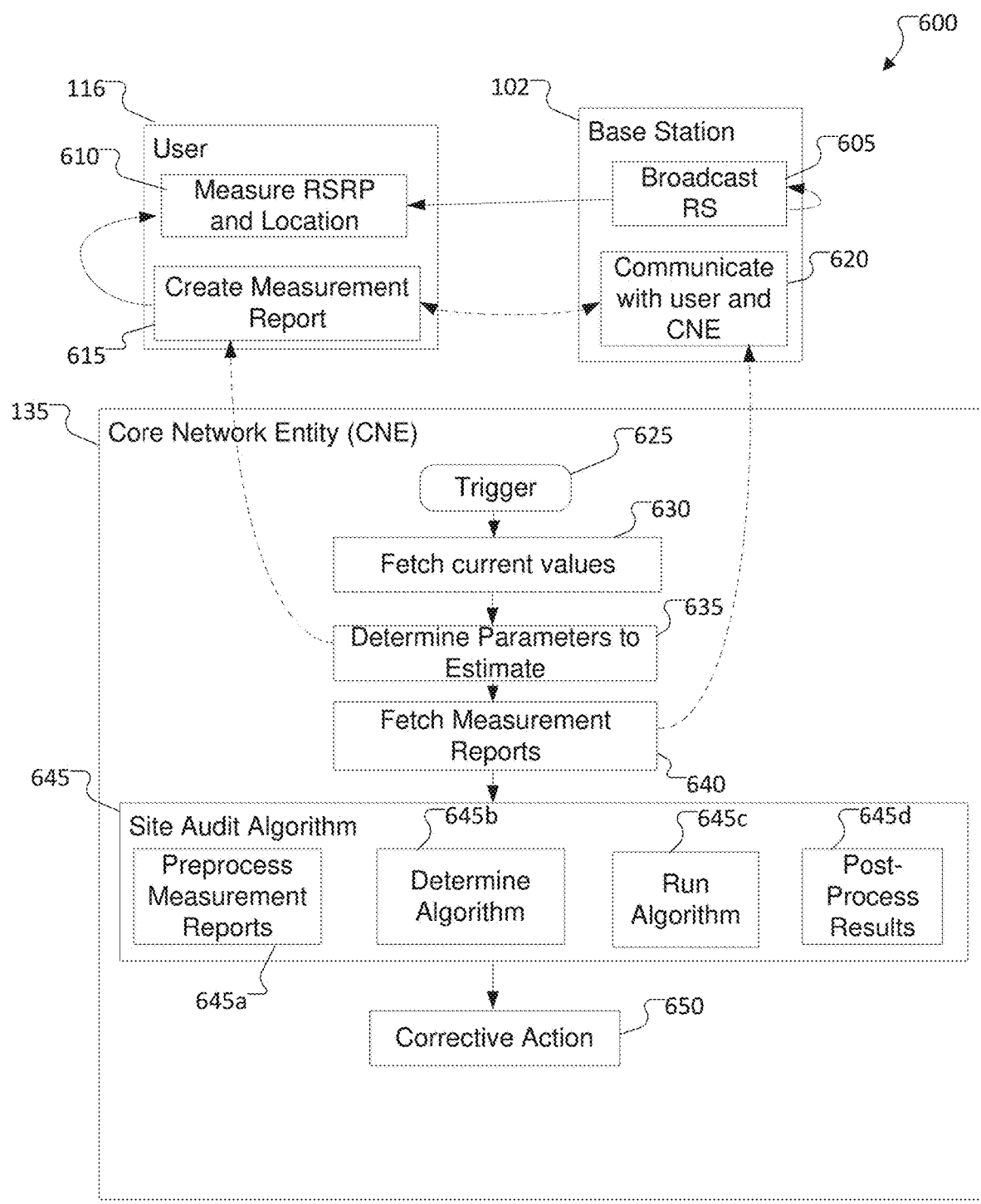
FIG. 6 illustrates a site audit process according to embodiments of the present disclosure.

FIG. 6 illustrates a site audit process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter and processor circuitry in, for example, a respective UE, core network entity, and base station. Process 600 can be accomplished by, for example, UE 116, gNB 102, and CNE 135 in network 100. The different operations and associated embodiments are described in more detail with respect to FIGS. 7-15.

The gNB 102 periodically transmits a reference signal (RS) 605 and also provides a communication link to the UE 116 and the CNE 135. The UE 116 receives the RS and measures the reference signal received power (RSRP) in block 610. In certain embodiments, the UE 116 includes additional sensors that are configured to obtain other information including an estimate of a location of the UE 116, as shown in block 610. In block 615, the UE 116 periodically encodes all this information and RSRP values into measurement reports. In response to a query, the UE 116 transmits the measurement reports to the CNE 135. In certain embodiments, the UE 116 receives the query from the CNE 135 directly or via the gNB 102 in block 620. In certain embodiments, the UE 116 receives the query from the gNB 102 in block 620. In certain embodiments, the UE 116 transmits the measurement reports directly to the CNE 135, via the gNB 102 in block 620, or via an alternate route.

The CNE 135 is responsible for the site audit process and correction or remedial measures. In response an external trigger 625, the CNE 135 initiates the audit process for a target gNB 102 by fetching the book-values and side information on the BS configuration parameters in block 630. That is, in block 630, the CNE 135 fetches current book values and BS configuration parameters. In block 635, based on the trigger 625 and fetched data, CNE 135 determines the BS parameters to estimate. In block 640, CNE 135 fetches measurement reports from one or more UEs 111-116 in a vicinity of gNB 102. Then, in block 645 CNE 130 runs the site audit algorithm 645 to obtain a result of the audit process. Based on the result, in block 650, the CNE 130 takes appropriate action or remedial measure as shall be discussed in more detail with respect to FIGS. 7-15. The site audit algorithm 645 includes several steps, including pre-processing of user reports 645a, determining which of a plethora of available algorithms to run 645b and running of the picked algorithms 645c, post-processing the results from the picked algorithms 645d.

In certain embodiments, gNB 102 broadcasts a reference signal (RS) to enable users in its neighborhood to measure the signal strength via an RSRP measurement. This RS may be an existing RS present in the 3GPP framework or can be a new RS transmitted with a pre-determined beam shape. The RS may either be broadcast periodically or may be triggered by a network condition. Both served UEs 111-114 and non-served UEs 115-116 in the neighborhood of gNB 102 may correspondingly measure the RSRP from gNB 102. The UEs 111-118 may be network subscribers or may be agents deployed by the service provider, such as to operate as RF scanners. The UEs 111-118 may be equipped with a global positioning system (GPS), altimeter, accelerometer gyroscope, and the like, and may periodically measure their location estimate, altitude, orientation, and so forth. Thus over time, UE 116 can create and save measurement reports, containing: (i) the time stamp of the report, (ii) RSRP for the serving gNB 103, (iii) RSRP from a neighboring gNB 102, (iv) the physical cell identifier (PCI) for the corresponding serving and neighboring BSs, (v) an estimate of the UE location, (vi) altitude of the UE, (vii) an indicator of the accuracy of the user location, (viii) orientation of the UE, (ix) a flag indicating the connectivity to a WiFi service, (x) an identifier for the make/model of the UE, (xi) timing advance configured for the UE, and the like. Over a period of time, several such reports can be collected and saved, and the entries from these measurement reports may also be deleted by the UE after an expiration time.

The CNE 135 is responsible for predicting and correcting the configuration parameters of BSs within its service area. In certain embodiments, the CNE 135 is a base station, such as gNB 103 itself. In certain embodiments, the CNE 135 initiates the audit process for a target BS, gNB 103 based on an external trigger. An example for such a trigger can be expiration of a timer, the output of a root cause analysis algorithm, and the like. In certain embodiments, the CNE 135 also maintains a database of configuration parameters of the BSs in its service area. In certain embodiments, the CNE 135 queries the target gNB 103 in order to obtain this information. Some of the parameters in the database may be inaccurate or missing.

Based on the trigger and the fetched configuration data, the CNE 135 determines the set of BS parameters to estimate or correct. In order to predict the determined parameters of a target gNB 103, the CNE 135 can collect and pool the measurement reports from terminals in the neighborhood of gNB 103. For example, the CNE 135 can collect and pool the measurement reports from one or more of UEs 115-118. In certain embodiments, the CNE 135 can collect and pool the measurement reports from a select UEs of UEs 115-118 that meet specified criteria. As shown in the example illustrated in FIG. 1, these terminals may also include terminals, such as UEs 115-116, associated with a neighboring gNB 102. The transmission of the reports to CNE 135 may be triggered periodically by a timer, by a specific UE condition, or may be triggered by gNB 103 or CNE 135 via a signaling message. The signaling message may also include a list of attributes to report and conditions for a UE to be eligible for reporting. For example, the CNE 135 may already have pooled several reports and may only desire reports from a specific critical geographic location.

In certain embodiments, the measurement reports from UE 118 is first transmitted to gNB 103 via a cellular link. The serving gNB 103 may collect multiple such reports, process the reports, and then forward to the CNE 135 via a backhaul link, which can be wired or wireless. In certain embodiments, the reports are collected by the CNE 135 via an alternate mechanism, such as via a Wi-Fi service. A user may periodically measure and create the user reports or may initiate measurement upon being triggered by the serving gNB 103. In order to predict the parameters for a target gNB 103, the CNE 135 pools the measurement reports from UEs 115-118, associated with target gNB 103 as well as from UEs associated with neighboring gNB 102, which are UEs 111-114.

Figure 7:
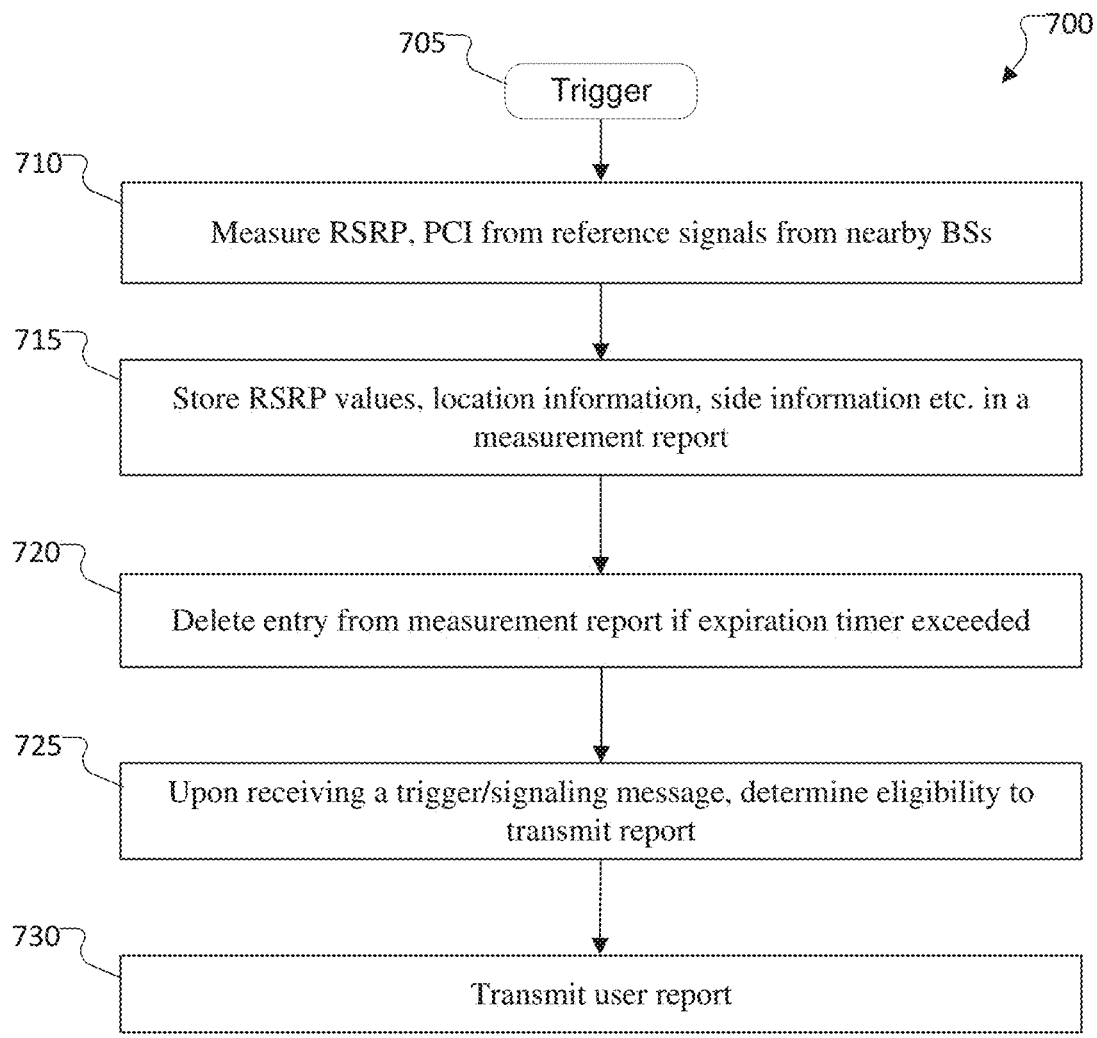
FIG. 7 illustrates a process for generation and collection of measurement reports by a user equipment according to embodiments of the present disclosure.

FIG. 7 illustrates a process for generation and collection of measurement reports by a user equipment according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter or processor chain in, for example, a UE. Process 700 can be accomplished by, for example, UE 111-118 in network 100.

A user device, such as UE 116, receives a trigger 705 to start RSRP measurements. The trigger 705 can be the successful decoding of a reference signal, a timing trigger, and the like. In block 710, UE 116 measures the RSRP values for the received reference signal, and may also acquire other information such as BS Physical Cell Identifier (PCI). In block 715, UE 116 can accumulate the RSRP values for nearby cells, along with other parameters such as location estimates, and the like as discussed herein above, in a measurement report. In block 720, UE 116 deletes one or more entries from the measurement report. For example, UE 116 may delete an entry from the measurement report in response to the expiration of a timer or if a predetermined time period has elapsed since the entry was recorded. Additionally, UE 116 may delete or modify an entry from the measurement report in response to when new updated values of measurements are available. In block 725, UE 116 receives a signaling message or a trigger to transmit user reports. In block 725, UE 116 also checks to determine whether UE 116 is eligible for reporting. Upon eligibility, UE 116 forwards (transmits) the measurement report to the CNE 135 in block 730. In certain embodiments, UE 116 transmits the measurement report via the parent BS, gNB 103. In certain embodiments, UE 116 transmits the measurement report through an alternate route, such as via WiFi service. In certain embodiments, UE 116 transmits the measurement report directly to the CNE 135.

Figure 8:
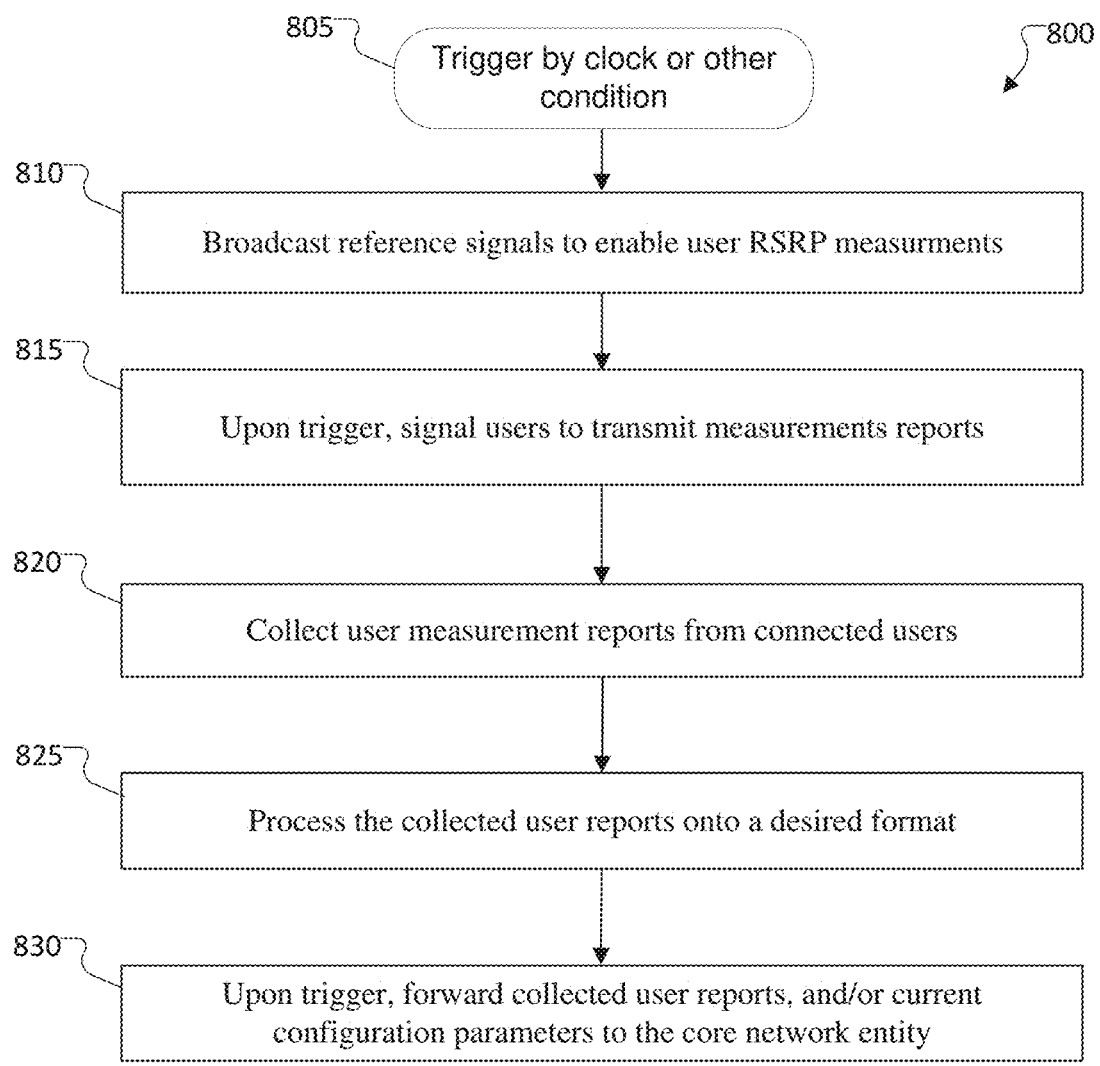
FIG. 8 illustrates a process for generation and collection of measurement reports by a base station according to embodiments of the present disclosure.

FIG. 8 illustrates a process for generation and collection of measurement reports by a base station according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter or processor chain in, for example, a BS. Process 800 can be accomplished by, for example, gNB 102 or gNB 103 in network 100.

The BS, such as gNB 103, may receive a timing or other trigger 805 to initiate new RS transmission. In block 810, gNB 103 can broadcast a reference signal to enable RSRP measurements. In block 815, in certain embodiments, gNB 103 receives a trigger from the CNE 135 to fetch measurement reports. In certain embodiments, gNB 103 may correspondingly send a request to its UEs, such as UEs 115-118. In block 820, in certain embodiments, gNB 103 collects the measurement reports from the served UEs, namely, one or more of UEs 115-118. In block 825, in certain embodiments, gNB 103 processes the collected user measurement reports. In block 830, gNB 103 forwards the processed measurement report and/or book values of BS configuration parameters and any side information to the core network entity via the backhaul connections.

Figure 9:
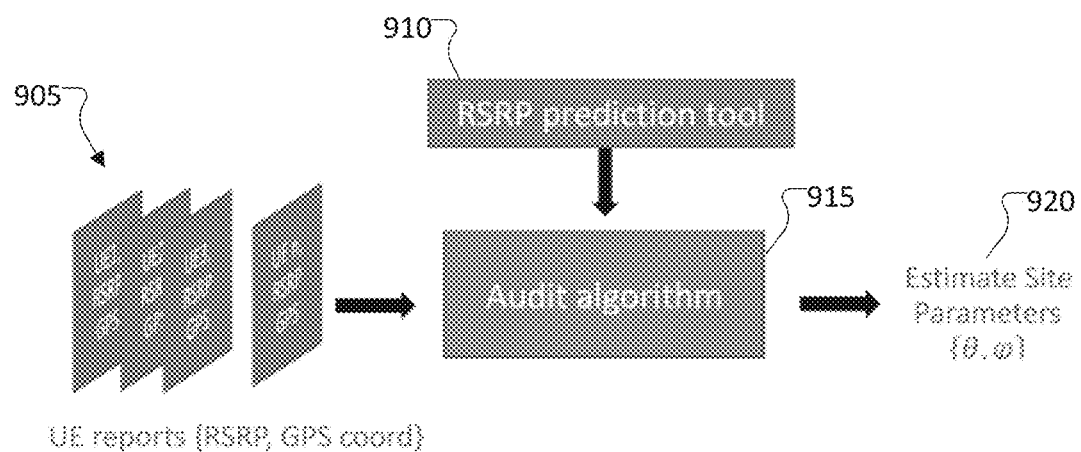
FIGS. 9 and 10 illustrate a model-based base station parameter estimation according to embodiments of the present disclosure.
Figure 10:

FIGS. 9 and 10 illustrate a model-based base station parameter estimation according to embodiments of the present disclosure. The embodiment of the parameter estimation shown in FIGS. 9 and 10 is for illustration only and other embodiments could be used without departing from the scope of the present disclosure.

After collecting the measurement reports 905 associated with a target gNB 103, the CNE 135 may undertake a preprocessing task to filter out faulty, corrupted or unwanted measurement reports. In certain embodiments, the CNE 135 also has access to a RSRP prediction tool 910 for estimating the RSRP heat map from gNB 103 to its surrounding area, such as heat maps 515, 520, and 525 in FIGS. 5B-5D. Examples of such tools include: wireless ray-tracing, statistical channel models, distance-dependent pathloss equations, and the like. The CNE 135 determines and executes an audit algorithm 915 to generate estimated site parameters 920. The audit algorithm 915 compares an expected strong RSRP region 1005 from the RSRP prediction tool 910 against a user distribution 1010 for strong RSRPs from the UE reports 905. By comparing the RSRP values in user measurement reports to the RSRP values in the tool's 910 heat map, the CNE 135 predicts correct values, that is estimated site parameters 920, of the error-prone BS configuration parameters.

Figure 11:
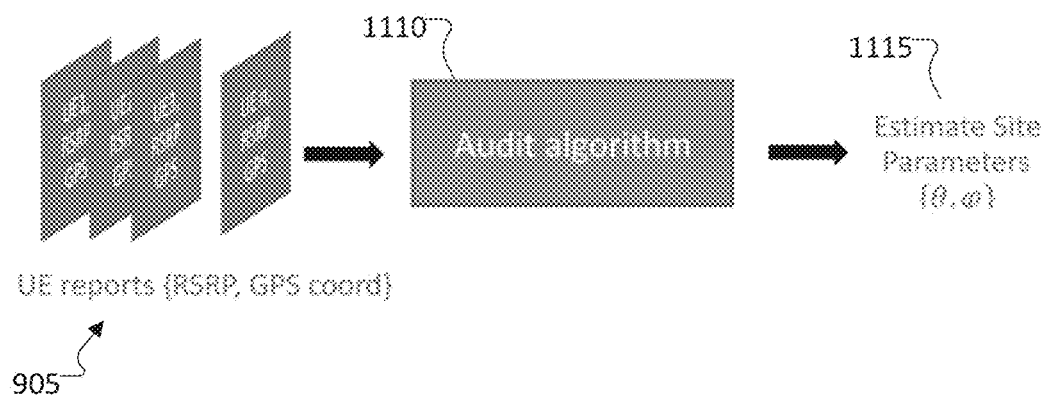
FIGS. 11 and 12 illustrate a model-free base station parameter estimation according to embodiments of the present disclosure.
Figure 12:
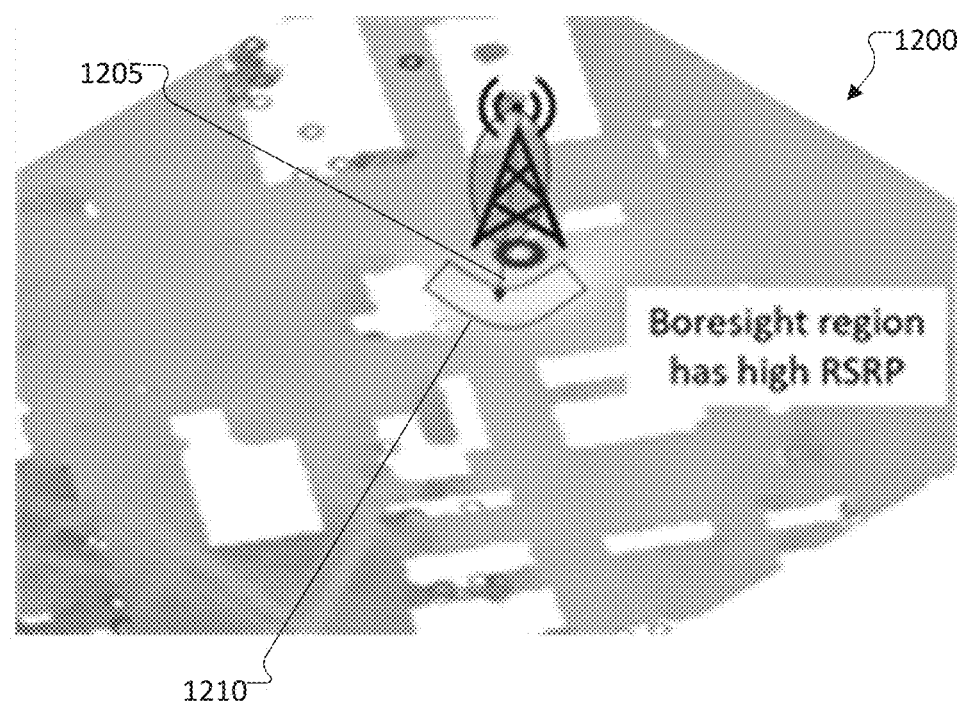

FIGS. 11 and 12 illustrate a model-free base station parameter estimation according to embodiments of the present disclosure. The embodiment of the parameter estimation shown in FIGS. 9 and 10 is for illustration only and other embodiments could be used without departing from the scope of the present disclosure.

In certain embodiments, the CNE 135 may not have access to an RSRP estimation tool 910. In this case, the BS parameters can be estimated using the UE reports 905 and some generic wireless propagation laws. Examples of such laws can be: UE reports are generally more densely distributed in the boresight direction 1205 of the antenna, as shown in heat map 1200, UE reported RSRPs are typically higher near the boresight direction 1205 of the antenna.

Many model and model-free algorithms 1010 are possible for such base station parameter estimation, and a few illustrative solutions are discussed in the following subsections. In certain embodiments, the CNE 135 has access to many such estimation algorithms 1010 and can first determine a subset of algorithms to execute to obtain estimated site parameters 1115. Such a determination can be based on: side information, BS parameters to estimate, the trigger initiating the site audit process etc. As an example, if the RSRP prediction tool 910 results are known to be inaccurate for a certain BS, the CNE 135 can decide to use the model-free estimation approach for that BS. In certain embodiments, the CNE 135 runs a first estimation algorithm, and based on the result and some logic, may determine to run additional estimation algorithms.

In certain embodiments, the estimated site parameters 915 or 1115 output from the model-based or model-free estimation may directly be the error-prone BS configuration parameters. In certain embodiments, the estimated site parameters 915 or 1115 output may be a likelihood score for the different realizations of the BS parameters. In certain embodiments, the estimated site parameters 915 or 1115 output may be an image of the predicted RSRP or coverage pattern around the BS.

Referring back to FIG. 1, in one example involving model-based estimation, the set of preprocessed measurement reports collected by the network entity 106 for a particular BS 102$a$ is represented by: $\{RSRP_u, LOC_u | u \in U\}$. Here U is the set of the users that transmitted the reports and $RSRP_u$, $LOC_u$ represent the RSRP received by user u from gNB 103 and the location estimate of the user terminal u, respectively. While the estimation approaches are applicable for any BS parameters, for ease of illustration, in this example, error prone BS parameters to be estimated are restricted to: azimuth angle θ and the mechanical down-tilt φ. The CNE 135 also has access to a tool for generating RSRP prediction in the area surrounding gNB 103. For any location LOC and given angle hypothesis: $\{\hat{\theta}, \hat{\varphi}\}$ this predicted RSRP value is defined as $\widetilde{RSRP}(LOC, \hat{\theta}, \hat{\varphi}, h)$. Here h is a vector of tool parameters whose accurate values may be unknown apriori, such as the pathloss exponent, reflection loss, and the like. For example, when $h=[h_0, h_1]$ includes a pathloss exponent error $h_0$ and bias error $h_1$:

$$\widetilde{RSRP}(LOC,\hat{\theta},\hat{\varphi},h) = \widetilde{RSRP}(LOC,\hat{\theta},\hat{\varphi}) + 10 h_0 \log d(LOC) + h_1, \tag{1}$$

where d(LOC) is the distance of LOC from the BS in meters. The BS parameter estimation problem can be formulated as:

$$\theta, \varphi = \underset{\hat{\theta},\hat{\varphi},h}{\mathrm{argmin}}\{\ell[\{RSRP_u, \widetilde{RSRP}(LOC_u, \hat{\theta}, \hat{\varphi}, h) | u \in \mathcal{U}\}]\}, \tag{2}$$

where $\ell(\cdot,\cdot)$ is a loss function that quantifies the gap between the observed RSRPs and the RSRP tool predictions for a given angle hypothesis $\hat{\theta}$, $\hat{\varphi}$. Some examples of $\ell(\cdot,\cdot)$ include the mean-squared error, correlation coefficient, etc. The search over $\hat{\theta},\hat{\varphi}$, h in the above equation can either be performed exhaustively, sequentially, iteratively or hierarchically. In certain embodiments, where while the minimizing argument may yield the angle estimates, the value of the loss at the minima may represent the likelihood score of the estimates. Such a likelihood may be utilized by the network entity to determine, for example, whether to update the parameter database or deploy a network engineer to physically check the BS parameters.

Parameter estimation with location error: In one embodiment the site audit algorithm is capable of accommodating for location errors in the user reports as discussed below.

Figure 13:
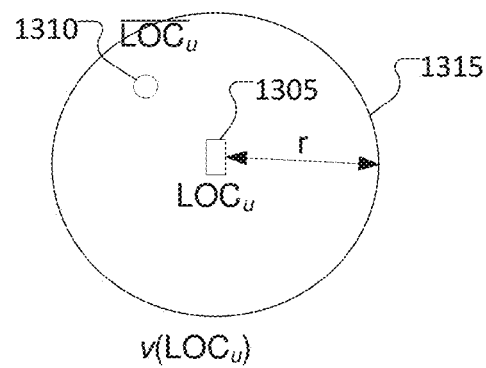
FIG. 13 illustrates location errors in user reports according to embodiments of the present disclosure.

FIG. 13 illustrates location errors in user reports according to embodiments of the present disclosure. The embodiment of the location errors in user reports shown in FIG. 13 is for illustration only and other embodiments could be used without departing from the scope of the present disclosure.

While the estimation approaches are applicable for any BS parameter, for ease of illustration, examples disclosed herein restrict error prone BS parameters to estimate to: azimuth angle θ and the mechanical down-tilt φ. The reported locations $LOC_u$ 1305 in the reports $\{RSRP_u, LOC_u | u \in \mathcal{U}\}$ may often be faulty, due to for example GPS errors. As an example, the true location $\overline{LOC}_u$ 1310 may lie in a ball of radius r around the reported location $LOC_u$ 1305, illustrated as $\mathcal{V}$ ($LOC_u$) 1315. To account for such errors, the estimation algorithms can be reformulated. As an example, for the mean square error loss function we can have:

$$\theta, \varphi = \underset{\hat{\theta}, \hat{\varphi}, h}{\operatorname{argmin}} \left\{ \sum_{u \in \mathcal{U}} \min_{LOC \in \mathcal{V}(LOC_u)} [RSRP_u - \widehat{RSRP}(LOC, \hat{\theta}, \hat{\varphi}, h)]^2 / |\mathcal{U}| \right\}. \quad (3)$$

Several other variations are also possible for combining the RSRP estimates within $\mathcal{V}$ ($LOC_u$) 1305 during the computation of the loss function. For example, in an embodiment where prior knowledge of user locations or location densities is available, the reported locations can be corrected before estimation as:

$$\theta, \varphi = \underset{\hat{\theta}, \hat{\varphi}, h}{\operatorname{argmin}} \{ \ell [\{RSRP_u, \widehat{RSRP}(m(LOC_u), \hat{\theta}, \hat{\varphi}, h) | u \in \mathcal{U}\}] \}, \quad (4)$$

where $m$ (•) is a location mapping function.

Parameter estimation with user weighting: In one embodiment of the site audit algorithm, the algorithm is capable of weighting different user reports appropriately as described below.

While the estimation approaches are applicable for any BS parameters, for ease of illustration, examples disclosed herein restrict error prone BS parameters to estimate to: azimuth angle θ and the mechanical down-tilt φ. In some embodiments, the accuracy of the user measurement reports may be different for different users. For example, location estimates may be more accurate for users in outdoor open areas, and with more sophisticated user devices. Similarly, the modeling accuracy of the RSRP prediction tool may be different for different regions. For example, it may be easier to model propagation in line-of-sight (LoS) regions than non-line-of-sight (nLoS) regions. Consequently, during the estimation process a higher weightage $w_u$ may be assigned to users with accurate models and/or less errors than others. As an example, the estimation process with the mean square error loss can be reformulated as:

$$\theta, \varphi = \underset{\hat{\theta}, \hat{\varphi}, h}{\operatorname{argmin}} \left\{ \sum_{u \in \mathcal{U}} w_u [RSRP_u - \widehat{RSRP}(LOC_u, \hat{\theta}, \hat{\varphi}, h)]^2 / |\mathcal{U}| \right\}. \quad (5)$$

In certain embodiments, a higher weightage can also be given to users in certain strategic locations, such as known high user density areas, or users for which the target BS is the serving BS.

Parameter estimation with side information: In one embodiment of the site audit algorithm, the algorithm is capable of exploiting side information or contextual information about the BS and the user reports as described next.

Figure 14:
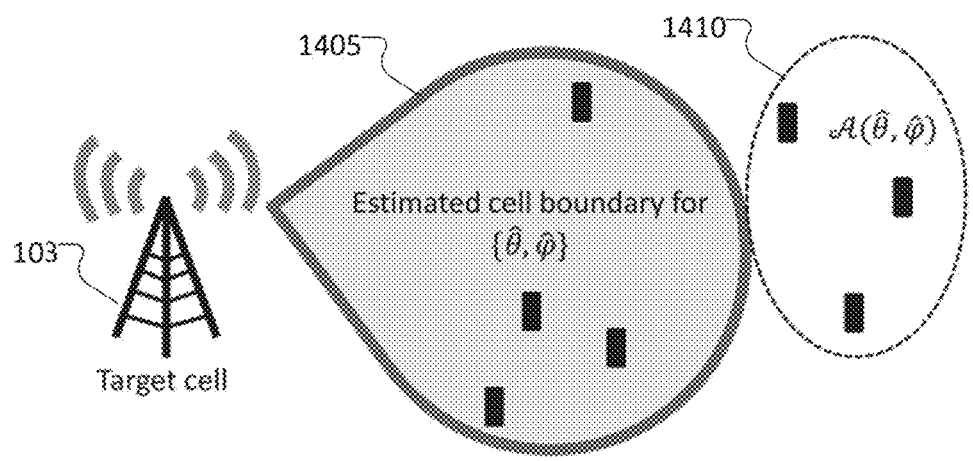
FIG. 14 illustrates a cell association boundary based parameter estimation according to embodiments of the present disclosure.

FIG. 14 illustrates a cell association boundary based parameter estimation according to embodiments of the present disclosure. The embodiment of cell association boundary based parameter estimation shown in FIG. 14 is for illustration only and other embodiments could be used without departing from the scope of the present disclosure.

While the estimation approaches are applicable for any BS parameters, for ease of illustration, examples disclosed herein restrict error prone BS parameters to estimate to: azimuth angle θ and the mechanical down-tilt φ. In certain embodiments, additional side information may be available at the CNE 135, such as an estimate of the cell boundary 1405 of the target gNB 103, apriori knowledge of user locations, previous estimates of the BS parameters, and the like. For example, a cell boundary 1405 can be estimated with knowledge of the configuration parameters for the BSs in the neighborhood of the target gNB 103, and by using the RSRP prediction tool 910 to predict RSRP from each of them. As another example, for each hypothesis of BS configuration parameters the cell boundary shape can be approximated as a sectoral region. In one embodiment, to exploit such cell association information, the estimation process can be reformulated as:

$$\theta, \varphi = \underset{\hat{\theta}, \hat{\varphi}, h}{\operatorname{argmin}} \{ \ell [\{RSRP_u, \widehat{RSRP}(LOC_u, \hat{\theta}, \hat{\varphi}, h) | u \in \mathcal{U}\}] + \quad (6)$$

$$p(\{u | u \in \mathcal{A}(\hat{\theta}, \hat{\varphi})\})\},$$

where $\ell$ (•,•) is a loss function that quantifies the gap between the observed RSRPs and the raytracing predictions for a given angle hypothesis $\hat{\theta}$, $\hat{\varphi}$, $\mathcal{A}$ ($\hat{\theta},\hat{\varphi}$) is the subset of users 1410 whose serving cell is the target gNB 103 but whose locations lie outside the cell boundary 1405 predicted by the RSRP prediction tool 910, and $p$ (•) is an associated penalty. In certain embodiments in which the RSRP prediction tool 910 is unavailable, a loss function $\ell$ (•,•) can be bypassed and the parameter estimation can be performed only using the cell association penalty $p$ (•). This embodiment can also be an example of model-free estimation.

Figure 15:
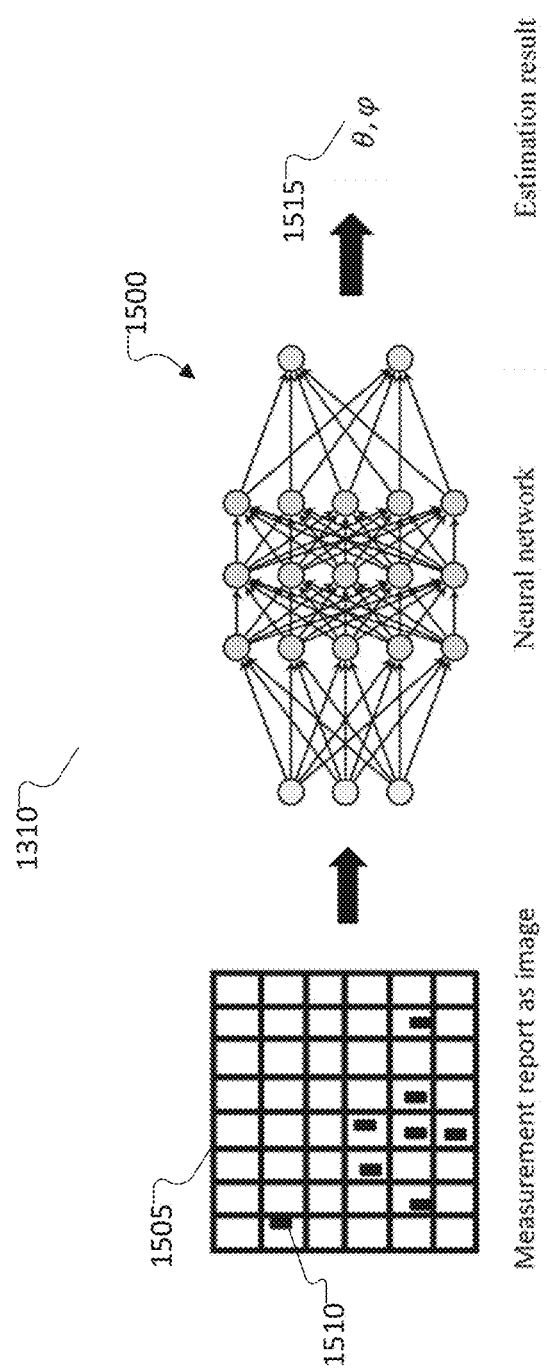
FIG. 15 illustrates deep learning based parameter estimation according to embodiments of the present disclosure.

FIG. 15 illustrates deep learning based parameter estimation according to embodiments of the present disclosure. The embodiment of the deep learning based parameter estimation 1500 shown in FIG. 15 is for illustration only and other embodiments could be used without departing from the scope of the present disclosure.

While the estimation approaches are applicable for any BS parameters, for ease of illustration, examples disclosed herein restrict error prone BS parameters to estimate to: azimuth angle θ and the mechanical down-tilt φ. In certain embodiments, the estimation of the correct BS configuration parameters may be performed using a neural network 1500. In certain embodiments, the measurement reports can be encoded as an image 1505, where the pixel coordinates 1510 represent location and pixel color or shading represents RSRP value. The neural network 1500 can then estimate the correct BS configuration parameter using the measurement image 1505 as an input, that is, an image classification task. A large number of real or simulated measurement reports can be collected to train the neural network 1500 to perform this task. In certain embodiments, the score function 1515 returned by the neural network 1500 can be a measure of the estimation accuracy and can be used to decide further actions to take. In certain embodiments, side information such as the reliability of the user reports, apriori estimates of the parameters, and the like, can be fed as additional input channels to the network.

In certain embodiments, the BS configuration parameters can be modeled as a time evolving random process. Such a time evolution can, for example, be modelled using a state transition model or a Markov process. Note that the state of a BS may include some of the BS configuration parameters along with some other hidden parameters. In certain embodiments, the CNE 135 stores the book values of the target BS parameters as well as a last estimate of the BS state. The CNE 135 can then use the past state estimate of the BS configuration as side information during the estimation process with new user reports. Example methods for performing such estimation include maximum apriori probability estimation with a state dependent prior, Kalman filtering, particle filter, partially observed Markov process, and the like.

In certain embodiments, a Bayesian filtering is used, of which Kalman and Particle filtering are special cases. The general Bayes filter algorithm that is used for tracking is given below. Here $X_t$ is the state of the system (like BS azimuth and tilt) at time t, $U_t$ are the controls (for instance if there is a planned action to change the state) and $Z_t$ are measurements (for instance UE measurement reports or UE locations). The belief of the system to be in state X is given as bel(X). Conditional probability of event A given event B is denoted as p(A|B). Note that bel(X)=p($X_t$|$X_{t-1}$,$U_t$,$Z_t$).

```
Algorithm Bayes_filter(bel(X_{t-1}), U_t, Z_t)
for all X_t do
    bel‾(X_t) = ∫ p(X_t|U_t, X_{t-1})bel(X_{t-1})dX_{t-1}
    bel(X_t) = ηp(Z_t|X_t)bel‾(X_t)
endfor
return bel(X_t)
```

Note that η is a normalizing term to make bel($X_t$) as a valid probability distribution. In order to implement this algorithm, which could be done using popular Kalman filtering or the particle filtering approach, models can be used that drive knowledge of p($Z_t$|$X_t$), which comes from a measurement model, and p($X_t$|$U_t$,$X_{t-1}$), which comes from a state transition/motion model.

Information obtained from UE GPS locations and measurement reports with known statistics in their error can be used to come up with knowledge of p($Z_t$|$X_t$) and p($X_t$|$U_t$,$X_{t-1}$). In certain embodiments, ray tracing information is used to aid estimating these conditional probabilities.

Since the BS azimuth and tilt are expected to not change with time, the following trivial stationary motion model can be used.

$$X_t = \begin{bmatrix} \theta_t \\ \phi_t \end{bmatrix} = \begin{bmatrix} \theta_{t-1} \\ \phi_{t-1} \end{bmatrix} + \begin{bmatrix} m_t \\ n_t \end{bmatrix} \tag{7}$$

where θ is the azimuth angle and φ is the tilt angle. Here, m, n are the noise terms, assuming for now to be some Gaussian with $\sigma_m^2$ and $\sigma_n^2$. Usually std dev values are expected to be very small, such as <0.1 degrees or so. The RSRP UE reports and the coarse UE GPS coordinates are obtained as the measurement values. Below equation is approximate connection between UE locations, RSRP values and the azimuth/tilt angle $$\begin{bmatrix} R_1 \\ \vdots \\ R_K \end{bmatrix} = \begin{bmatrix} G(\theta, \phi, U_1 + \alpha_1)f(U_1 + \alpha_1) \times \beta_1 + \gamma_1 \\ \vdots \\ G(\theta, \phi, U_K + \alpha_K)f(U_K + \alpha_K) \times \beta_K + \gamma_K \end{bmatrix} \tag{8}$$

Equation 8 can be referenced as the measurement model. Here, $f(x)$ function maps location $x \in R^2$ of UE 116 to corresponding ray tracing RSRP with omni-directional antennas, $U_i$ indicates UE location measurement, $\alpha_i$ indicates the error in GPS location reported for user i and $\{\beta_i, \gamma_i\}$ indicates multiplicative and additive randomness that maps ray tracing estimates to real measurements on left hand side ($R_i$). The intuition behind this equation is as follows. On the right hand side, f(.) gives estimate of RSRP assuming omni-directional pattern. Multiplying with antenna gain G(.) approximately yields the RSRP if there were a directional antenna with azimuth θ, tilt φ at UE locations given by $U_i$, for which the measured values are on the left hand side of the equation. The parameters $\{\beta,\gamma\}$ are key to the equation to allow some additive or multiplicative noise of ray tracing versus real measurements. Connecting this formulation back into the conditional probabilities to estimate in the Bayesian filtering problem, $$p(X_t|X_{t-1},U_t)=1(X_t=X_{t-1}). \tag{9}$$

$$P(Z_t|X_t)=p(R_1=r_1, \ldots R_K=r_K, U_1=u_1, \ldots, U_K=u_K|X_t) \tag{10}$$

Using the measurement model and Monte Carlo sampling of random variables $\{\alpha, \beta, \gamma\}$ the conditional probability can be estimated.

In certain embodiments, in order to simplify the computation of this conditional probability, the RSRP values and UE locations are quantized into some discrete sets. For example, RSRP values can take values between 1 to N, with N being the best RSRP possible and 1 being the worst RSRP. In certain embodiments, the parameters $\{\alpha, \beta, \gamma\}$ can be tuned based on whether UE 116 is indoor or outdoor is known. For example, the GPS error is higher for indoor versus outdoor and thus a higher standard deviation of α can be chosen for indoor users and a lower standard deviation can be chosen for outdoor users.

In certain embodiments, the gNB 103 antenna panel includes an inertial measurement unit (IMU) installed thereon. Such IMU can provide knowledge on change in azimuth and tilt as knows its own orientation with respect to a fixed coordinate frame. Such inputs from IMU on the knowledge of change in the state $X_t$ can serve as control input $U_t$ in the above formulation. For example, letting $U_t$ denote relative change in azimuth and tilt angle perceived by the IMU, the conditional probability p($X_t$|$X_{t-1}$,$U_t$) is modified as $$p(X_t \mid X_{t-1}, U_t) = 1(X_t = X_{t-1} + U_t), \text{ where } U_t = \begin{bmatrix} \Delta \theta_t \\ \Delta \phi_t \end{bmatrix} + \zeta$$

denotes relative change in azimuth and tilt reported by IMU with ζ denoting the noise in IMU measurements.

Parameter estimation without RSRP prediction tool (model free): In another embodiment of the site audit algorithm the CNE can perform the BS parameter estimation without an RSRP prediction tool, and is referred to as model-free estimation.

While the estimation approaches are applicable for any BS parameters, for ease of illustration, examples disclosed herein restrict error prone BS parameters to estimate to: azimuth angle θ and the mechanical down-tilt φ. In certain embodiments of model free estimation are based on the general observation that the RSRP is highest near the antenna boresight direction, as illustrated in FIG. 12. In this case, a soft partition of the region around gNB 103 can be created for each θ and φ, and the median measured RSRP of user reports within each partition can be computed. This can, for example, reduce the effects of outliers in the measured data as well as different user report densities around the base station. Representing median RSRP of partition $\hat{\theta}$, $\hat{\varphi}$ as $\overline{RSRP}_{\hat{\theta},\hat{\varphi}}$, the parameter estimation problem can be formulated as:

$$\theta, \varphi = \operatorname*{argmin}_{\hat{\theta},\hat{\varphi}} \{\ell(\overline{RSRP}_{\hat{\theta},\hat{\varphi}})\}, \qquad (11)$$

Several data-driven loss functions $\ell$ (•) are possible to optimize performance. In one embodiment, Deep Neural Networks can also be used to learn a good loss function.

Figure 16:
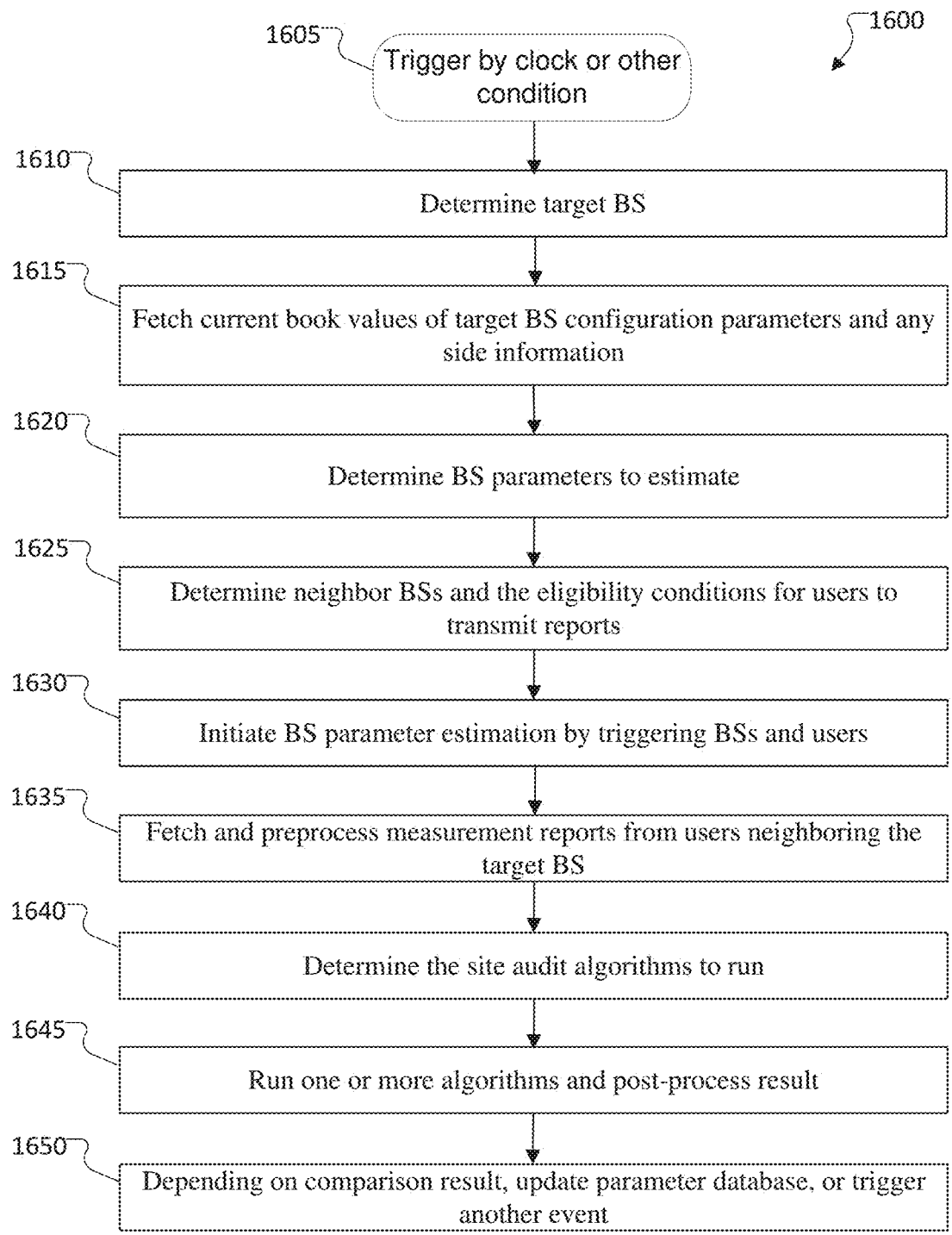
FIG. 16 illustrates a core network entity operation in site audit correction according to embodiments of the present disclosure.

FIG. 16 illustrates a core network entity operation in site audit correction according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter or processor chain in, for example, a BS. Process 1600 can be accomplished by, for example, CNE 135, gNB 102 or gNB 103 in network 100.

The CNE 135 can run one or more site audit algorithms sequentially or in parallel. The CNE 135 can correspondingly post process the results from multiple algorithms to merge them. By comparing the final estimation result to the book values of the BS parameters, the CNE 135 can determine either to update the parameter database, or can generate an alarm indicating a possible misconfiguration of the BS. This determination can be based on, for example, difference in the estimation result from the book values, based on the likelihood score of the predicted value, based on the likelihood score of the book value, and the like. The alarm may further trigger a secondary action such as dispatching a site engineer to gNB 1035.

In block 1605, a timer or a certain network condition may trigger site audit correction task for a target gNB 103. In block 1610 the CNE 135 determines the target gNB 103 for site audit, based on the trigger. In block 1615, in certain embodiments, the CNE 135 fetches the book values of the target BS configuration from either a database or by querying the target gNB 103. In block 1620, the CNE 135 determines which BS configuration parameters are error-prone or corrupted are require estimation. In block 1625, the CNE 135 determines the BSs and the user device eligibility conditions for transmission of reports. In block 1630, the CNE 135 initiates the measurement report collection by signaling these BSs and/or user devices associated with gNB 103. In block 1635, in certain embodiments, the CNE 135 fetches the measurement reports and preprocess them to remove unwanted or corrupted entries. In block 1640, the CNE 135 determines which of the plethora of estimation approaches to use. In block 1645, the CNE 135 generates RSRP predictions using a prediction tool (if applicable), and uses the chosen approaches to estimate the error-prone BS configuration parameters or their likelihood scores, and post-process them. In block 1650, based on the results of the estimation, the CNE 135 may take corrective actions such as correcting the parameter database, dispatching a site engineer, initiating new network reconfiguration application, and the like.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. An apparatus comprising:
a transceiver configured to communicate via a wired or wireless communication medium; and
a processor configured to:
in response to a triggering event, fetch information on a base station (BS) configuration parameters, the BS configuration parameters comprising at least one of: a location of the BS, a height of the BS, an orientation of the BS, an antenna pattern of the BS, and topographical details surrounding the BS;
determine one or more of the BS configuration parameters that are error prone and require re-estimation;
obtain measurement reports created by at least one user equipment (UE), wherein the measurement reports comprise a signal strength value and a location of the at least one UE;
determine an audit method to perform an audit correction;
perform the audit correction, to obtain a result based on a computed score for each candidate value of the one or more of the BS configuration parameters;
generate, based on the result, one or more corrective actions; and
adjust at least one of the BS configuration parameters based on the one or more corrective actions.

2. The apparatus of claim 1, wherein the processor is configured to determine the audit method based on an availability of a cell-planning or signal strength prediction tool, and required topographical information, wherein:
when both the cell-planning or signal strength prediction tool and required topographical information is available, the computed score is based on a comparison of user measurements to tool-predicted signal strength values, and
when one of the cell-planning or signal strength prediction tool or topographical information is unavailable, the computed score is based on a matching between the measurement reports and some statistical rules,
wherein the processor is configured to use the determined audit method to calibrate parameters of the signal strength prediction tool.

3. The apparatus of claim 1, wherein the audit correction is based on the one or more of the BS configuration parameters to re-estimate, available BS information and the measurement reports.

4. The apparatus of claim 1,
wherein the result comprises one of:
candidate values for the one or more of the BS configuration parameters with a highest score; or
a score of a particular choice of the one or more of the BS configuration parameters, and wherein:
the one or more corrective actions comprises at least one of:
updating of database parameters with the re-estimated parameters; or
raising an alarm for site visit based on a score value being below a certain threshold.

5. The apparatus of claim 1, wherein, to obtain the measurement reports, the processor is configured to receive the measurement reports from the at least one UE based on at least one of:
periodically, in response to expiration of a timer;
in response to a specific user device condition;
in response to a request from the BS or apparatus,
in response to a signaling message that includes a list of attributes to report or conditions for the at least one UE to be eligible for reporting, or
in response to the at least one UE being in a specified location.

6. The apparatus of claim 1, wherein to estimate the one or more BS configuration parameters, the processor is configured to one or more of:
filter one or more measurement reports that are faulty, corrupted, or unwanted;
estimate a reference signal received power (RSRP) heat map from the BS to its surrounding for each candidate value of the one or more of the BS configuration parameters based on one or more of: wireless ray-tracing, statistical channel models, and distance-dependent pathloss equations;
compare RSRP values in measurement reports to the RSRP values in the RSRP heat map to predict correct values of the one or more BS configuration parameters;
perform parameter estimation based on a weighting applied to the at least one UE among a plurality of UEs providing the measurement reports, where in the weighting is based on one or more of a location error of the at least one UE or a reported RSRP value;
perform parameter estimation based on one or more of: an estimate of a cell boundary of the BS, apriori knowledge of a number of UE locations, or previous estimates of the one or more BS configuration parameters; and
perform parameter estimation based using a neural network configured to encode the measurement reports as an image in which pixel coordinates represent location and pixel color represents a reference signal received power (RSRP) value, wherein a score function returned by the neural network comprises a measure of an estimation accuracy.

7. The apparatus of claim 1, wherein the triggering event comprises one of:
expiration of a timer,
an output of a root cause analysis algorithm, and
comparison of the one or more of the BS configuration parameters against stored values of the one or more of the BS configuration parameters.

8. A method comprising:
in response to a triggering event, information on a base station (BS) configuration parameters, the BS configuration parameters comprising at least one of: a location of the BS, a height of the BS, an orientation of the BS, an antenna pattern of the BS, and topographical details surrounding the BS;
determining one or more of the BS configuration parameters that are error prone and require re-estimation;
obtaining measurement reports created by at least one user equipment (UE), wherein the measurement reports comprise a signal strength value and a location of the at least one UE;
determining an audit method to perform an audit correction;
performing the audit correction to obtain a result based on a computed score for each candidate value of the one or more of the BS configuration parameters;
generating, based on the result, one or more corrective actions; and
adjusting at least one of the BS configuration parameters based on the one or more corrective actions.

9. The method of claim 8, wherein the audit method is determined based on an availability of a cell-planning or signal strength prediction tool, and required topographical information, wherein:
when both the cell-planning or signal strength prediction tool and required topographical information is available, the computed score is based on a comparison of user measurements to tool-predicted signal strength values,
when one of the cell-planning or signal strength prediction tool or topographical information is unavailable, the computed score is based on a matching between the measurement reports and some statistical rules, and
wherein the determined audit method is used to calibrate parameters of the signal strength prediction tool.

10. The method of claim 8, wherein the audit correction is based on the one or more of the BS configuration parameters to re-estimate, available BS information and the measurement reports.

11. The method of claim 8,
wherein the result comprises one of:
candidate values for the one or more of the BS configuration parameters with a highest score; or
a score of a particular choice of the one or more of the BS configuration parameters, and wherein:
the one or more corrective actions comprises at least one of:
updating of database parameters with the re-estimated parameters; or
raising an alarm for site visit based on a score value being below a certain threshold.

12. The method of claim 8, wherein obtaining the measurement reports comprises receiving the measurement reports from the at least one UE based on at least one of:
periodically, in response to expiration of a timer;
in response to a specific user device condition;
in response to a request from the BS or a core network entity,
in response to a signaling message that includes a list of attributes to report or conditions for the at least one UE to be eligible for reporting, or in response to the at least one UE being in a specified location.

13. The method of claim 8, wherein determining one or more of the BS configuration parameters to estimate further comprises:
filtering one or more measurement reports that are faulty, corrupted, or unwanted;
estimating a reference signal received power (RSRP) heat map from the BS to its surrounding for each candidate value of the one or more of the BS configuration parameters based on one or more of: wireless ray-tracing, statistical channel models, and distance-dependent pathloss equations;
comparing RSRP values in measurement reports to the RSRP values in the RSRP heat map to predict correct values of the one or more BS configuration parameters;
performing parameter estimation based on a weighting applied to the at least one UE among a plurality of UEs providing the measurement reports, where in the weighting is based on one or more of a location error of the at least one UE or a reported RSRP value;
performing parameter estimation based on one or more of: an estimate of a cell boundary of the BS, apriori knowledge of a number of UE locations, or previous estimates of the one or more BS configuration parameters; and
performing parameter estimation based using a neural network configured to encode the measurement reports as an image in which pixel coordinates represent location and pixel color represents a reference signal received power (RSRP) value, wherein a score function returned by the neural network comprises a measure of an estimation accuracy.

14. The method of claim 8, wherein the triggering event comprises one of:
expiration of a timer,
an output of a root cause analysis algorithm, and
comparison of the one or more of the BS configuration parameters against stored values of the one or more of the BS configuration parameters.

15. A non-transitory computer readable medium comprising a plurality of instructions that, when executed by a processor, is configured to cause the processor to:
in response to a triggering event, fetch information on a base station (BS) configuration parameters, the BS configuration parameters comprising at least one of: a location of the BS, a height of the BS, an orientation of the BS, an antenna pattern of the BS, and topographical details surrounding the BS;
determine one or more of the BS configuration parameters that are error prone and require re-estimation;
obtain measurement reports created by at least one user equipment (UE), wherein the measurement reports comprise a signal strength value and a location of the at least one UE;
determine an audit method to perform an audit correction;
perform the audit correction to obtain a result based on a computed score for each candidate value of the one or more of the BS configuration parameters;
generate, based on the result, one or more corrective actions; and
adjust at least one of the BS configuration parameters based on the one or more corrective actions.

16. The non-transitory computer readable medium of claim 15, wherein the plurality of instructions is configured to cause the processor to determine the audit method based on an availability of a cell-planning or signal strength prediction tool, and required topographical information, wherein:
when both the cell-planning or signal strength prediction tool and required topographical information is available, the computed score is based on a comparison of user measurements to tool-predicted signal strength values, and
when one of the cell-planning or signal strength prediction tool or topographical information is unavailable, the computed score is based on a matching between the measurement reports and some statistical rules,
wherein the instructions are configured to cause the processor to use the determined audit method to calibrate parameters of the signal strength prediction tool.

17. The non-transitory computer readable medium of claim 15, wherein the audit correction is based on the one or more of the BS configuration parameters to re-estimate, available BS information and the measurement reports.

18. The non-transitory computer readable medium of claim 15,
wherein the result comprises one of:
candidate values for the one or more of the BS configuration parameters with a highest score; or
a score of a particular choice of the one or more of the BS configuration parameters, and wherein:
the one or more corrective actions comprises at least one of:
updating of database parameters with the re-estimated parameters; or
raising an alarm for site visit based on a score value being below a certain threshold.

19. The non-transitory computer readable medium of claim 15, wherein, to obtain the measurement reports, the plurality of instructions are configured to cause the processor to receive, from the at least one UE, the measurement reports base on at least one of:
periodically, in response to expiration of a timer;
in response to a specific user device condition;
in response to a request from the BS or apparatus,
in response to a signaling message that includes a list of attributes to report or conditions for the at least one UE to be eligible for reporting, or
in response to the at least one UE being in a specified location.

20. The non-transitory computer readable medium of claim 15, wherein to estimate the one or more BS configuration parameters, the plurality of instructions is configured to cause the processor to:
filter one or more measurement reports that are faulty, corrupted, or unwanted;
estimate a reference signal received power (RSRP) heat map from the BS to its surrounding for each candidate value of the one or more of the BS configuration parameters based on one or more of: wireless ray-tracing, statistical channel models, and distance-dependent pathloss equations;
compare RSRP values in measurement reports to the RSRP values in the RSRP heat map to predict correct values of the one or more BS configuration parameters;
perform parameter estimation when the measurement reports include a location error of the at least one UE;
perform parameter estimation based on a weighting applied to the at least one UE among a plurality of UEs providing the measurement reports;
perform parameter estimation based on one or more of: an estimate of a cell boundary of the BS, apriori knowledge of a number of UE locations, or previous estimates of the one or more BS configuration parameters; and perform parameter estimation based using a neural network configured to encode the measurement reports as an image in which pixel coordinates represent location and pixel color represents a reference signal received power (RSRP) value, wherein a score function returned by the neural network comprises a measure of an estimation accuracy.

* * * * *